US012623146B2

(12) United States Patent
Kim et al.

(10) Patent No.: US 12,623,146 B2
(45) Date of Patent: May 12, 2026

(54) APPARATUS AND METHOD FOR PROVIDING GAME MAPS

(71) Applicant: NEXON GAMES CO., LTD, Seoul (KR)

(72) Inventors: Sang Mun Kim, Seongnam-si (KR); Dong Il Jeong, Seongnam-si (KR)

(73) Assignee: NEXON GAMES CO., LTD, Seoul (KR)

( * ) Notice: Subject to any disclaimer, the term of this patent is extended or adjusted under 35 U.S.C. 154(b) by 478 days.

(21) Appl. No.: 17/993,625

(22) Filed: Nov. 23, 2022

(65) Prior Publication Data

US 2023/0166188 A1 Jun. 1, 2023

(30) Foreign Application Priority Data

Nov. 26, 2021 (KR) ........................ 10-2021-0165260
Mar. 16, 2022 (KR) ........................ 10-2022-0032577

(51) Int. Cl.
*A63F 13/5378* (2014.01)
*A63F 13/69* (2014.01)

(52) U.S. Cl.
CPC .......... *A63F 13/5378* (2014.09); *A63F 13/69* (2014.09)

(58) Field of Classification Search
CPC .............................. A63F 13/5378; A63F 13/69
USPC .......................................................... 463/31
See application file for complete search history.

(56) References Cited

U.S. PATENT DOCUMENTS

| | | | | |
|---|---|---|---|---|
| 9,474,967 B2 * | 10/2016 | Bojorquez | ............ | A63F 13/352 |
| 10,029,177 B2 * | 7/2018 | Linden | .................... | A63F 13/46 |
| 2022/0189256 A1 * | 6/2022 | Shaya | ................... | G07F 17/323 |

FOREIGN PATENT DOCUMENTS

KR 10-1868286 B1 6/2018

OTHER PUBLICATIONS

Yeodongdong, "How to make a game Aion jumping character, friend invitation event", It's A Funny Attic, Sep. 27, 2019, https://m.blog.naver.com/hypoid613/221658888198 (12 pages total).

Seonggusho, "X COM 2 Gameplay: Surprise, Random Map, Stronger Aliens, Loot", RULIWEB, Jun. 3, 2015, https://bbs.ruliweb.com/pc/board/300007/read/1740769 (8 pages total).

A.V.A, "Update information on Jan. 26, (Tuesday)", Pmang, Jan. 25, 2016, https://ava.pmang.com/?mKey=1&sKey=1&bserial=21&ano=41740065 (1 page total).

Captain Kim Soo-ho, "[Counter-Strike Online] Zombie Z with a unique concept where the map changes every round! Creator Idea Legend", Mar. 25, 2020, https://www.youtube.com/watch?v=wC1qD05h28c.

Carrot, "Battlefield 4 Guide:2. Game mode and interface", How to use Battlefield 4: Naver Blog, Jul. 28, 2020, pp. 1-20,(48 pages), https://blog.naver.com/sok0145/222044081313.

(Continued)

*Primary Examiner* — Allen Chan
(74) *Attorney, Agent, or Firm* — Sughrue Mion, PLLC

(57) ABSTRACT

Disclosed herein are an apparatus and method for providing game maps. The apparatus for providing game maps includes memory configured to store maps for the play of a blast mission game, and a controller configured to provide a map including varied game play environment information for each round of the blast mission game.

18 Claims, 8 Drawing Sheets

(56) References Cited

OTHER PUBLICATIONS

Lee Doo-hyun, IINVEN, "Nexon, TPS emphasizing three-dimensional action, 'Project D' expected to be unveiled soon," Oct. 5, 2021 (3 pages) URL: https://www.inven.co.kr/webzine/news/?news=263188.

Yoon Seo-ho, INVEN, "Nexon recruits alpha testers for PC TPS new game 'Project D'," Nov. 11, 2021 (2 pages) URL: https://www.inven.co.kr/webzine/news/?news=264724.

* cited by examiner (a)                    (b)

Figure 8:
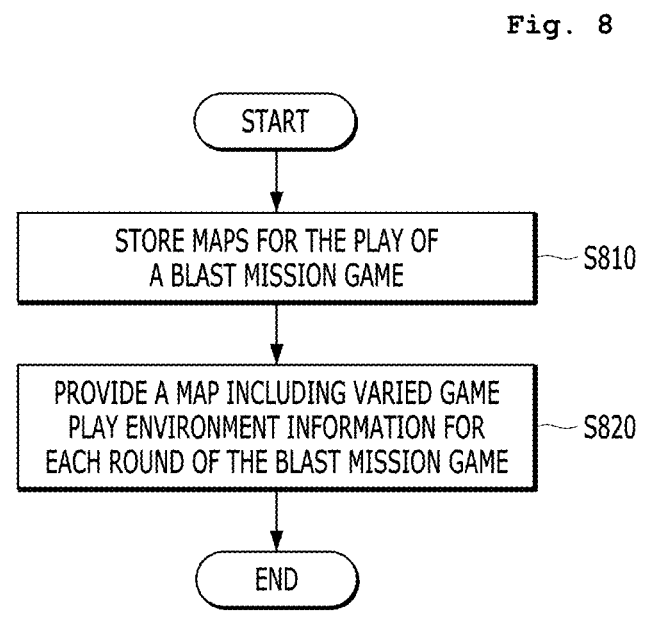

```
        ┌─────────┐
        │  START  │
        └────┬────┘
             │
             ▼
┌──────────────────────────────┐
│  STORE MAPS FOR THE PLAY OF   │── S810
│     A BLAST MISSION GAME      │
└───────────────┬──────────────┘
                │
                ▼
┌──────────────────────────────┐
│ PROVIDE A MAP INCLUDING VARIED GAME │
│ PLAY ENVIRONMENT INFORMATION FOR    │── S820
│ EACH ROUND OF THE BLAST MISSION GAME│
└───────────────┬──────────────┘
                │
                ▼
           ┌─────────┐
           │   END   │
           └─────────┘
```

APPARATUS AND METHOD FOR PROVIDING GAME MAPS

CROSS-REFERENCE TO RELATED APPLICATION

This application claims the benefit of Korean Patent Application No. 10-2021-0165260 filed on Nov. 26, 2021 and Korean Patent Application No. 10-2022-0032577 filed on Mar. 16, 2022, which is hereby incorporated by reference herein in its entirety.

BACKGROUND

1. Technical Field

The embodiments disclosed herein relate to an apparatus and method for providing game maps, and more particularly to an apparatus and method for providing game maps that provide a map, which is provided for the play of a blast mission game, for each round in a variable manner.

2. Description of the Related Art

Recently, the types and genres of games provided via online game systems have been diversified. In particular, action games in which game users perform missions such as battles between game users or blasts are attracting attention from game users. Meanwhile, one genre of action games is a shooting game. Shooting games are games in which game users eliminate enemies or obstacles using guns or weapons. Such shooting games include First-Person Shooter (FPS) games and Third-Person Shooter (TPS) games.

An FPS game is a fighting game which is played through the point of view of a character in the game, and is called a first-person shooting game. Meanwhile, a TPS game is a game in which a game user plays the game while directly viewing a character, and is called a third-person shooting game.

Such a shooting game is played in such a manner that the shooting game provides a game user with a map including various geographic features and objects and the game user performs given missions while moving through a map using his or her character in the game. In this case, various types of missions may be present, and one type of mission is a blast mission.

In blast mission games, a number of game users participating in a game are divided into an attacking team and a defending team, and the game users are allowed to perform tasks such as the task of installing or disarming a bomb on a preset target while performing battles with each other, thereby determining victory or defeat. In this case, the final victory may be given to a team that wins more rounds while performing a plurality of predetermined rounds.

Meanwhile, the game is played in such a manner that a preset map is provided to each game user and the game user performs a given blast mission while moving through the above-described map using his or her character. Generally, a map including the same geographic features and objects is provided for all rounds.

When a map including the same geographic features and objects is provided for all rounds as described above, game users may easily become familiar with the geographic features and objects included in the map, and a game user who has played the game on the same map many times may occupy an excellent spot in advance.

However, there is a problem in that a game user who has occupied an excellent spot in advance may finish a game excessively easily and other game users may lose the game excessively easily, so that game users can easily lose interest in the game.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

Related Art Literature

Patent document 1: Korean Patent No. 10-1868286 (published on Jun. 15, 2018)

SUMMARY

An object of the embodiments disclosed herein is to present an apparatus and method for providing game maps.

An object of the embodiments disclosed herein is to present an apparatus and method for providing game maps that provide a map including varied game play environment information for each round of a blast mission game.

As a technical solution for accomplishing the above object, according to an embodiment, there is provided an apparatus for providing game maps, the apparatus including: memory configured to store maps for the play of a blast mission game; and a controller configured to provide a map including varied game play environment information for each round of the blast mission game.

According to another embodiment, there is provided a method of providing game maps, the method being performed by an apparatus for providing game maps, the method including: storing maps for the play of a blast mission game; and providing a map including varied game play environment information for each round of the blast mission game.

According to still another embodiment, there is provided a non-transitory computer-readable storage medium having stored thereon a program that, when executed by a processor, causes the processor to execute a method of providing game maps, wherein the method includes: storing maps for the play of a blast mission game; and providing a map including varied game play environment information for each round of the blast mission game.

According to still another embodiment, there is provided a computer program that is executed by an apparatus for providing game maps and stored in a non-transitory computer-readable storage medium in order to perform a method of providing game maps, wherein the method includes: storing maps for the play of a blast mission game; and providing a map including varied game play environment information for each round of the blast mission game.

BRIEF DESCRIPTION OF THE DRAWINGS

The above and other objects, features, and advantages of the present invention will be more clearly understood from the following detailed description taken in conjunction with the accompanying drawings, in which:

FIG. 8 is a flowchart illustrating a method of providing game maps according to an embodiment.

DETAILED DESCRIPTION

Figure 1:
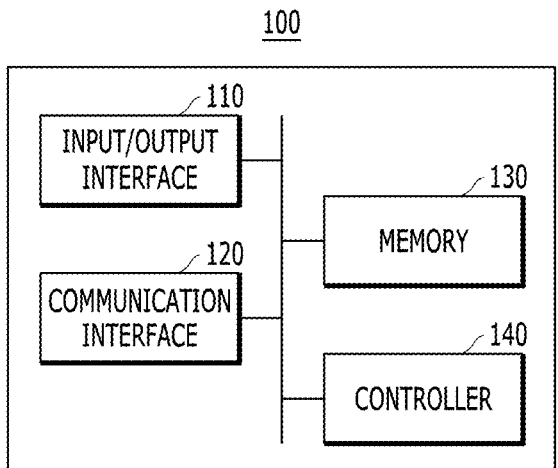
FIG. 1 is a block diagram showing an apparatus for providing game maps according to an embodiment.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component arranged therebetween." Furthermore, when one portion is described as "including" one component, this does not mean that the portion does not exclude another component but means that the portion may further include another component, unless explicitly described to the contrary.

Embodiments of the present invention will be described in detail below with reference to the accompanying drawings.

Prior to the following description, the terms to be described below will be defined first.

First, a blast mission game may be played in such a manner that game users participating in the game are divided into an attacking team and a defending team and the game users are allowed to perform tasks such as the task of installing a bomb or disarming an installed bomb on a preset target, and may be a type of shooting game. It may be provided in any one of an FPS game mode and a TPS game mode. If the attacking team installs a bomb and eliminates a preset target within a time limit, or if the defending team stops the attacking team from blasting the preset target within a time limit, victory will be given to either the attacking team or the defending team who succeeded in the mission. In this case, the blast mission game may be set such that the final victory is given to a team that wins more rounds while performing a plurality of predetermined rounds. For example, in the case where the blast mission game is played for a total of 7 rounds, if team A wins a total of 4 rounds and team B wins a total of 3 rounds, the final winning team in the blast mission game may be team A.

In addition to the terms defined above, terms requiring definitions will be described separately below.

FIG. 1 is a block diagram showing an apparatus 100 for providing game maps according to an embodiment, and FIGS. 2 to 7 are exemplary diagrams illustrating the apparatus 100 for providing game maps according to the present embodiment.

The apparatus 100 for providing game maps shown in FIG. 1 is an apparatus that provides game maps required for the play of a blast mission game in a game provided by a game provision apparatus (not shown) according to a method of providing game maps. The apparatus 100 for providing game maps may be included in a game provision apparatus (not shown), or may include a game provision apparatus (not shown). When the apparatus 100 for providing game maps is implemented as an apparatus separate from a game provision apparatus (not shown), the apparatus 100 for providing game maps may transmit and receive information required for the performance of a method of providing game maps while communicating with the game provision apparatus.

The apparatus 100 for providing game maps may be implemented as an electronic terminal on which an application capable of interacting with a game user is installed, or may be implemented as a server-client system. When the apparatus 100 for providing game maps is implemented as a server-client system, it may include an electronic terminal on which an application for an online service for interaction with a game user is installed.

In this case, the electronic terminal may be implemented as a computer, a portable terminal, a television, a wearable device, or the like that can connect to a remote server over a network or connect with other terminals and a server. In this case, the computer includes, e.g., a notebook, a desktop, a laptop, and the like each equipped with a web browser. The portable terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type that can be directly worn on a human body, such as a watch, glasses, an accessory, clothing, shoes, or the like, and can access a remote server or be connected to another terminal directly or via another information processing device over a network.

In addition, the server may be implemented as a computer capable of communicating over a network with an electronic terminal on which an application or web browser for interaction with a user is installed, or may be implemented as a cloud computing server. Furthermore, the server may include a storage device capable of storing data, or may store data through a third server.

As described above, the apparatus 100 for providing game maps may be implemented in the form of any one of an electronic terminal and a server-client system. When the apparatus 100 for providing game maps is implemented as a server-client system, components constituting the apparatus 100 for providing game maps may be implemented in a plurality of physically separated servers, or may be implemented in a single server.

The apparatus 100 for providing game maps according to the present embodiment may include an input/output interface 110, a communication interface 120, memory 130, and a controller 140.

The input/output interface 110 may include an input interface configured to receive input from a game user, and an output interface configured to display information such as the results of the performance of a task, the status of the apparatus 100 for providing game maps, etc. For example, the input/output interface 110 may include an operational panel configured to receive input from a game user, and a display panel configured to display screens.

More specifically, the input interface may include devices capable of receiving various types of user input, such as a keyboard, physical buttons, a touch screen, a camera, a microphone, etc. Furthermore, the output interface may include a display panel, a speaker, etc. However, the input/output interface 110 is not limited thereto, but may include components capable of supporting various types of input and output.

According to an embodiment, the input interface may receive input related to the manipulation of a game from a game user when the game is being played, and may receive input related to the provision of a game map. Furthermore, the output interface may output and provide the results of an operation based on the manipulation of a game user.

The communication interface 120 may perform wired/wireless communication with another device or a network. For example, the communication interface 120 may transmit/receive various types of information required for performing a method of providing game maps while communicating with a third server. To this end, the communication interface 120 may include a communication module configured to support at least one of various wired/wireless communication schemes. For example, the communication module may be implemented in the form of a chipset.

Meanwhile, the wireless communication supported by the communication interface 120 may be wireless mobile communication such as Wireless Fidelity (Wi-Fi), Wi-Fi Direct, Bluetooth, Bluetooth Low Energy (BLE), Ultra-Wide Band (UWB), Near Field Communication (NFC), and/or the like. In addition, the wired communication supported by the communication interface 120 may be, e.g., Universal Serial Bus (USB), High Definition Multimedia Interface (HDMI), and/or the like.

According to an embodiment, when the apparatus 100 for providing game maps is implemented as a server, the communication interface 120 may receive the input of a game user from an electronic terminal used by the game user, and may transmit the results of an operation based on the performance of a method of providing game maps to the electronic terminal used by the game user.

Various types of data such as files, applications, and programs may be installed and stored in the memory 130. The controller 140 may access and use the data stored in the memory 130, or may store new data in the memory 130. Also, the controller 140 may execute a program installed in the memory 130. For example, the memory 130 may have a program for performing a method of providing game maps installed thereon, and may store various types of information for performing the method of providing game maps, as described above.

Meanwhile, according to an embodiment, various maps for performing a blast mission game may be stored in the memory 130.

A blast mission game according to an embodiment may be a TPS game. A TPS game is a third-person shooting game in which cannonballs or various weapons can be used. A TPS game may provide a wider field of view than an FPS game, which is a first-person shooting game, because the TPS game allows a game user to eliminate the enemy and perform missions while directly viewing a character. In addition, a blast mission game may be an FPS game. An FPS game is a fighting game played through the point of view of a character in a game, and is called a first-person shooting game.

The controller 140 controls the overall operation of the apparatus 100 for providing game maps, and may include a processor such as a central processing unit (CPU) or a graphics processing unit (GPU). The controller 140 may control other components included in the apparatus 100 for providing game maps so that they can perform an operation corresponding to the input of a game user. For example, the controller 140 may execute a program stored in the memory 130, may read a file stored in the memory 130, or may store a new file in the memory 130.

According to an embodiment, the controller 140 may provide a map for each round of a blast mission game. In this case, the map may be a game play environment in which a game user plays the blasting mission game. In other words, the game play environment may refer to a virtual space in the game that is provided to the game user in order to allow the game user to play the blast mission game therein. The controller 140 may provide a map for each round of the blast mission game, and may provide the same map for all rounds or provide different maps for respective rounds. In the present embodiment, different maps may be provided for respective rounds, and a more detailed description thereof will be given later.

The controller 140 provides a map for each round of the blast mission game, and the map may include varied game play environment information. In this case, the game play environment information may include at least one of the location of at least one blast target object, one or more objects constituting the map, and a magnetic field area. In this case, the blast target object may be a geographic object to be blasted in the blast mission game, e.g., a building or a container. Furthermore, the objects constituting the map may be, e.g., objects such as a geographic feature indicative of a shape of the land by which a curvature of the land is represented, and/or a geographic object such as a building or a container. Finally, the magnetic field area may be any battle area that is preset to limit the area in which a battle between game users occurs when a blast mission game is played. In this case, during the play of the blast mission game, when a game user leaves the preset magnetic field area, the character of the game user may suffer damage or die. In other words, the magnetic field area may refer to a battle area that is preset to limit the activity range within which a game user can move when playing a blast mission game.

Figure 2:
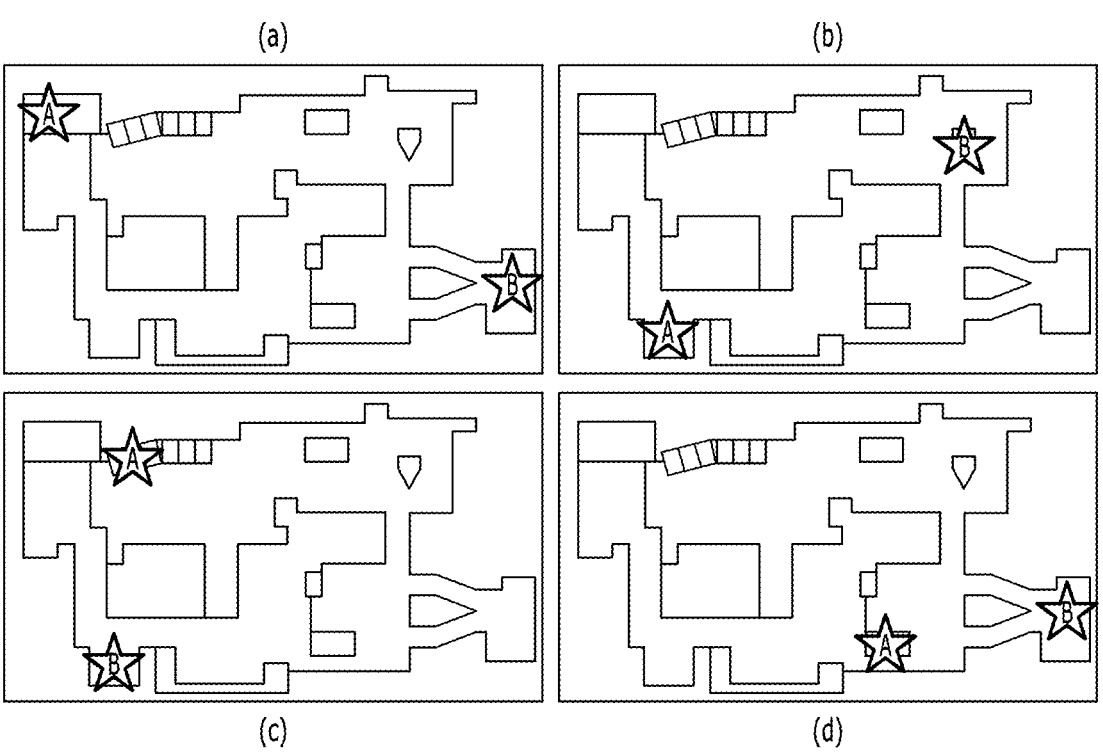
FIGS. 2 to 7 are exemplary diagrams illustrating the apparatus for providing game maps according to the embodiment.

Meanwhile, when a game user succeeds in a blast mission of the blast mission game, the controller 140 may provide a map in which game play environment information is varied by changing the location of a blast target object. FIG. 2 is a diagram showing maps in which the locations of blast target objects are shown as being different in a blast mission game. Such maps may be stored in advance in the memory 130. For example, in the first round of the blast mission game, the controller 140 may provide a game user with a map including locations A and B of blast target objects, as shown in FIG. 2(*a*). Thereafter, when the game user succeeds in a blast mission of the blast mission game and the first round of the blast mission game ends, the controller 140 may provide the game user with the map shown in FIG. 2(*b*) in which the locations A and B of the blast target objects are different from those of FIG. 2(*a*). Furthermore, when the game user succeeds in a blast mission of the blast mission game and the second round of the blast mission game ends, the controller 140 may provide the game user with the map shown in FIG. 2(*c*) in which the locations A and B of the blast target objects are different from those of FIG. 2(*b*). Furthermore, when the game user succeeds in a blast mission of the blast mission game and the third round of the blasting mission game ends, the controller 140 may provide the game user with the map shown in FIG. 2(*d*) in which the locations A and B of the blast target objects are different from those of FIG. 2(*c*). Meanwhile, the locations A and B of the blast target objects such as those shown in FIGS. 2(*a*) to 2(*d*) may be randomly marked on maps and stored in the memory 130. In other words, the memory 130 may store various maps including the different locations of blast target objects. Accordingly, when the game user succeeds in a blast mission of the blasting mission game, the controller 140 may provide the game user with any one map stored in the memory 130, as described above. Furthermore, the maps may include only objects including geographic features and objects used for the game user to play the blast mission game, and may be stored in various forms in the memory 130. In this case, the controller 140 may set the locations of the blast target objects to random locations on a map including only objects including geographic features and objects used for the game user to play the blast mission game, and may provide the map to the game user. Meanwhile, the controller 140 may randomly mark the locations of the blast target objects on a map stored in the memory 130, and may provide the map to the game user. In more detail, a plurality of blast target objects may be set at locations randomly selected from among a plurality of preset locations. For example, when the locations at which blast target objects can be set on a map to be provided to the game user are preset to four locations A, B, C, and D, the controller 140 may randomly select two locations from among the above-described preset locations and set the blast target objects on the map. In other words, the controller 140 may set the blast target objects to be located at randomly selected locations A and C on the map, and may provide the map to the game user.

Figure 3:
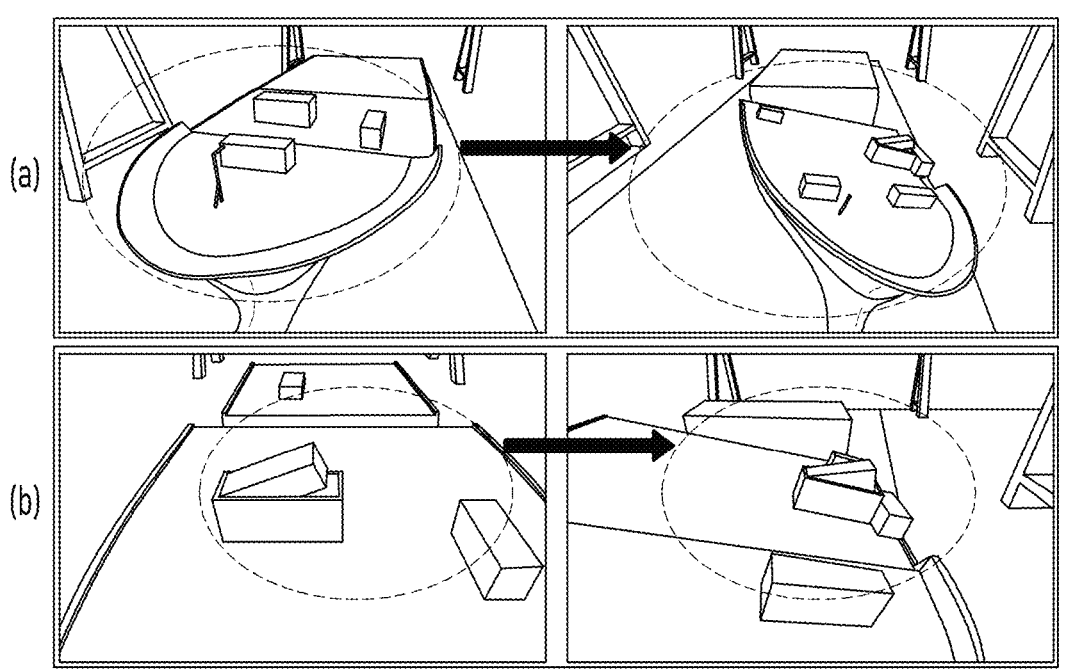

Furthermore, when the game user succeeds in a blast mission of the blast mission game, the controller 140 may provide a map including varied game play environment information in which the locations of the blast target objects are changed and changes to the objects destroyed by a blast or a battle having occurred during the performance of a blast mission are applied. In other words, when the game user succeeds in a blast mission of the blast mission game, the controller 140 may provide a map in which game play environment information is varied by reflecting the objects destroyed during the performance of a blast or the blast mission in the map. FIG. 3 is a diagram showing objects destroyed by a blast mission during the performance of the blast mission or objects destroyed or changed by a battle that occurred between game users. In other words, the left views of FIGS. 3(*a*) and 3(*b*) show maps including objects before the occurrence of a blast or battle, and the right views of FIGS. 3(*a*) and 3(*b*) show maps including objects destroyed or changed due to the occurrence of a blast or battle. For example, in the first round of the blast mission game, the controller 140 may provide the game user with a map including the locations A and B of blast target objects as shown in FIG. 2(*a*) and also including objects as shown in the left views of FIGS. 3(*a*) and 3(*b*). Thereafter, when the game user succeeds in a blast mission of the blast mission game and the first round of the blast mission game ends, the controller 140 provides a map shown in FIG. 2(*b*) in which the locations A and B of the blast target objects are different from those of FIG. 2(*a*), with one or more objects destroyed or changed due to a blast or a battle having occurred between game users during the play of the blast mission game being applied to the map, as shown in FIGS. 3(*a*) and 3(*b*).

Meanwhile, the controller 140 may provide a map, provided to the game user in the previous round, to the game user in a subsequent round, with only information about one or more objects changed in the previous round, e.g., one or more objects destroyed by a blast mission or destroyed or changed by a battle having occurred between game users being reflected in the map. For example, when objects A, B, C, and D are included in a map provided to a game user in a first round and the game user blasts the objects B and C according to a blast mission, the objects A and D may be included without change in a map to be provided to the game user in a second round, and a new map including the objects B and C deformed by the blast may be provided to the game user. In more detail, when the game user succeeds in a blast mission of the blast mission game, the controller 140 may provide the map, provided in the previous round, in a subsequent round, with the locations of one or more blast target objects being maintained without change or with one or more blast target objects being set at other locations. For example, when blast target objects are set at the locations A and B in a map provided in a first round, a blast mission is performed, and only a blast target object located at the location A is blasted, the controller 140 may provide the same map to the game user in a second round as in the first round, with blast target objects being set at a location C, which is different from the location A, and the location B, which is the same as in the first round or with blast target objects being set at a location A-1, which is the same as the blasted location A, and the location B, which is the same as in the first round.

Meanwhile, when the game user fails in a blast mission of the blast mission game, the controller 140 may provide a map including varied game play environment information in which the locations of one or more blast target objects are not changed but only changes to one or more objects destroyed by a battle having occurred during the play of the blast mission game are applied. For example, in the first round of the blast mission game, the controller 140 may provide a map, including the locations A and B of the blast objects shown in FIG. 2(*a*) and the objects shown in the left views of FIGS. 3(*a*) and 3(*b*), to a game user. Thereafter, when the game user fails in a blast mission of the blast mission game and the first round of the blast mission game ends (in this case, the objects shown in the left views of FIGS. 3(*a*) and 3(*b*) are deformed by a battle during the performance of the blast mission), the controller 140 may provide a map including varied game play environment information to which the locations A and B of the blast objects shown in FIG. 2(*a*) and the changes to the objects destroyed by a battle having occurred between game users during the play of the blast mission game shown in the right views of FIGS. 3(*a*) and 3(*b*) are applied.

Meanwhile, although the description in which when the game user fails in a blast mission of the blast mission game, the controller 140 may provide a map including varied game play environment information in which the locations of one or more blast target objects are not changed but only changes to one or more objects destroyed by a battle having occurred during the play of the blast mission game are applied has been given in the above embodiment, the present invention is not limited thereto. Even when the game user fails in a blast mission of the blasting mission game, the controller 140 may provide a map including varied game play environment information to which the changed locations of blast target objects and changes to one or more objects destroyed during the play of the blast mission game are applied. In other words, even when a blast does not occur due to the failure of a blast mission, the controller 140 may provide a map in which game play environment information is varied. In this case, the game play environment information may include at least one of the changed locations of one or more blast target objects, one or more objects constituting the map and destroyed or lost by a battle, and a changed magnetic field area.

Figure 4:
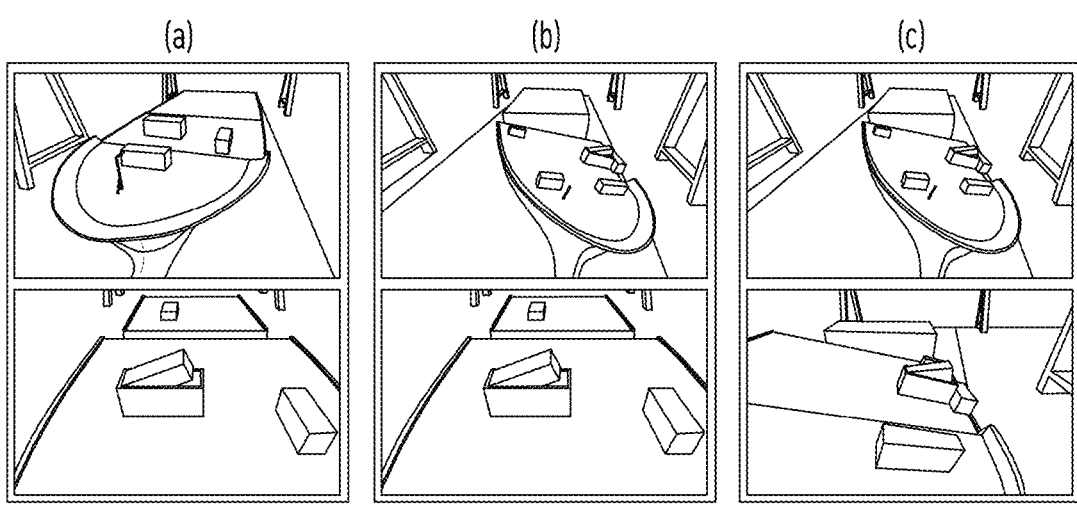

Furthermore, as each round of the blast mission game ends, the controller 140 may apply at least part of the game play environment information, varied in the previous round, to a map to be provided in a subsequent round and then provide the map. In other words, as each round of the blast mission game ends, the controller 140 may apply at least part of game play environment information, including changes to objects destroyed during the play of the blast mission game, to a map to be provided in a subsequent round and then provide the map, regardless of the success or failure of a blast mission. In other words, as each round of the blast mission game ends, the controller 140 may apply at least part of game play environment information, including changes to one or more objects destroyed during the play of the blast mission game, to a map to be provided in a subsequent round and then provide the map. FIG. 4 shows a map, including game play environment information varied in a previous round, e.g., varied game play environment information to which changes to objects destroyed during the play of a blast mission game are applied, that is provided as the round ends. FIG. 4(*a*) shows a part of a map provided in the first round of a blast mission game, FIG. 4(*b*) shows a part of a map provided in the second round of the blast mission game, and FIG. 4(*c*) shows a part of a map provided in the third round of the blast mission game. For example, referring to FIGS. 4(*a*) to 4(*c*), the controller 140 may provide a map including the game play environment information shown in FIG. 4(*a*), e.g., objects constituting a map, in the first round of the blast mission game. It can be seen that objects not destroyed by a blast or battle are included in the map shown in FIG. 4(*a*). Thereafter, when the first round of the blast mission game ends, the controller 140 may apply changes to objects, destroyed by a blast or battle having occurred between game users during the play of the blast mission game, as shown in the upper part of FIG. 4(*b*), to a map and then provide the map in a second round. Thereafter, when the second round of the blast mission game ends, the controller 140 may apply changes to objects, destroyed by a blast or battle having occurred between game users during the play of the blast mission game, as shown in the lower part of FIG. 4(*c*), to a map and then provide the map in a third round. As described above, as each round of the blast mission game ends, the controller 140 may apply at least part of the game play environment information varied in the previous round, i.e., at least part of varied game play environment information to which changes to objects destroyed by a blast or battle having occurred between game users during the play of the blast mission game are applied, to a map to be provided in a subsequent round and, and may then provide the map.

As described above, as game play environment information included in a map is varied, a game user may perform various game strategies even when playing the game on the same map, thereby allowing the game use to be more immersed in the game. Furthermore, since the game user may feel changes in the play style as the game strategies become diversified, the interest of the game user in the game may be further improved.

Furthermore, a map including varied game play environment information is provided for each round of a blast mission game, so that a game user can be prevented from occupying an excellent spot in advance.

Meanwhile, the controller 140 may provide a map in which a magnetic field area is varied in game play environment information. In this case, the magnetic field area may be any battle area that is preset to limit the area in which a battle between game users occurs when a blast mission game is played. In other words, the magnetic field area may refer to a battle area that is preset to limit the activity range within which a game user can move when playing a blast mission game.

Figure 5:
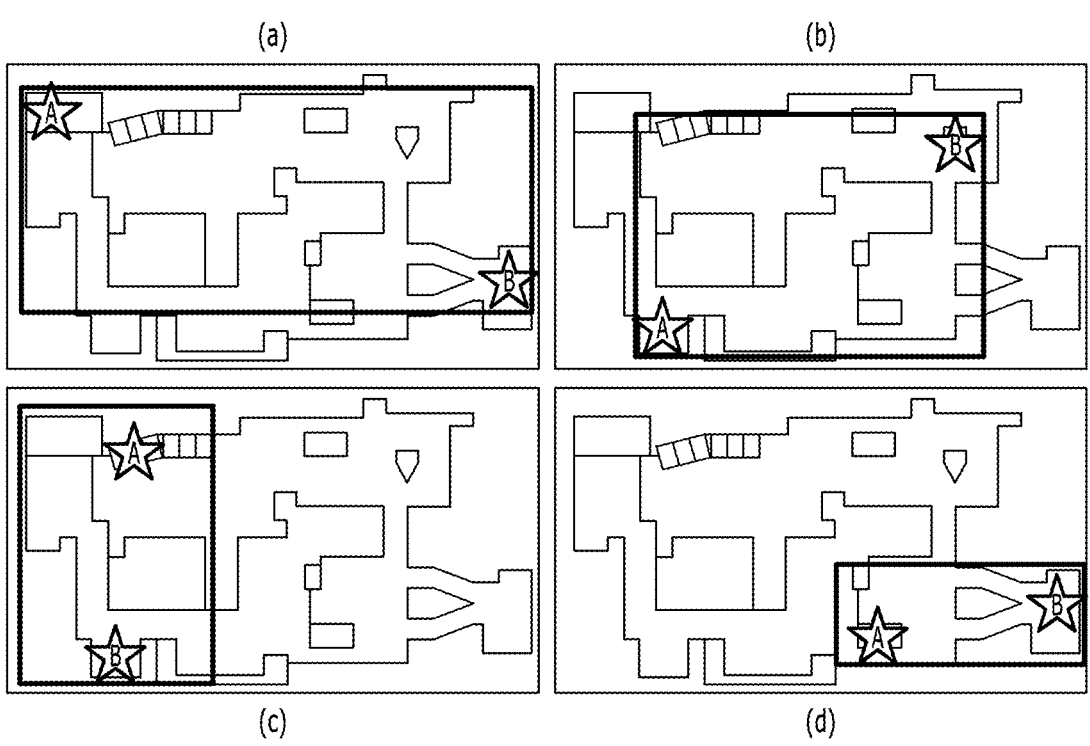

The controller 140 may vary the magnetic field area whenever the location of a blast target object is changed. FIG. 5 is a diagram showing maps in which various magnetic field areas are shown. From the maps shown in FIGS. 5(*a*) and 5(*b*), it can be seen that a magnetic field area is varied around blast target objects A and B whenever the location of a blast target object is changed. In this case, the magnetic field area may refer to an area bounded by a rectangle. As described above, the controller 140 varies the magnetic field area whenever the location of a blast target object is changed, so that a game user has a limited activity range around the blasting target objects, with the result that the concentration on a blast mission can be improved.

Figure 6:
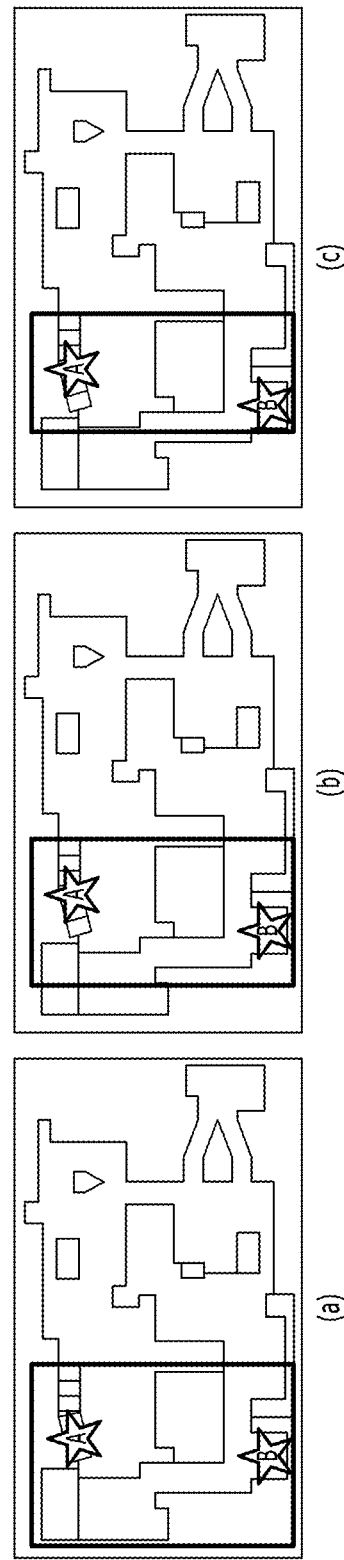

Meanwhile, the controller 140 may reduce the size of the magnetic field area whenever each round ends. FIG. 6 shows an example in which the size of a magnetic field area is reduced whenever each round ends. More specifically, FIG. 6(*a*) shows the size of a magnetic field area shown on a map provided in a first round, and FIG. 6(*b*) shows the size of a magnetic field area shown in a map provided in a second round, and FIG. 6(*c*) shows the size of a magnetic field area shown in a map provided in a third round. In this case, the magnetic field area may refer to the area bounded by a rectangle. For example, as shown in FIG. 6(*a*), the controller 140 may set the size of the magnetic field area on the map to be provided in the first round. Thereafter, as shown in FIG. 6(*b*), the controller 140 may set a magnetic field area, having a smaller size than the magnetic field area set on the map provided in the first round, in a map to be provided in a second round. Thereafter, as shown in FIG. 6(*c*), the controller 140 may set a magnetic field area, having a smaller size than the magnetic field area set on the map provided in the second round, in a map to be provided in a third round. As described above, the controller 140 may reduce the size of the magnetic field area set on the map whenever each round ends. As described above, when the size of the magnetic field is reduced whenever a round ends, the activity range of game users participating in the blast mission game is reduced, so that the progress of the game can be faster. Furthermore, as the game users participating in the blast mission game participate in the blast mission game within the gradually limited activity range, the probability of encountering an opponent increases, and thus a more urgent situation is generated, so that the immersion of the game users in the game can be improved.

Figure 7:
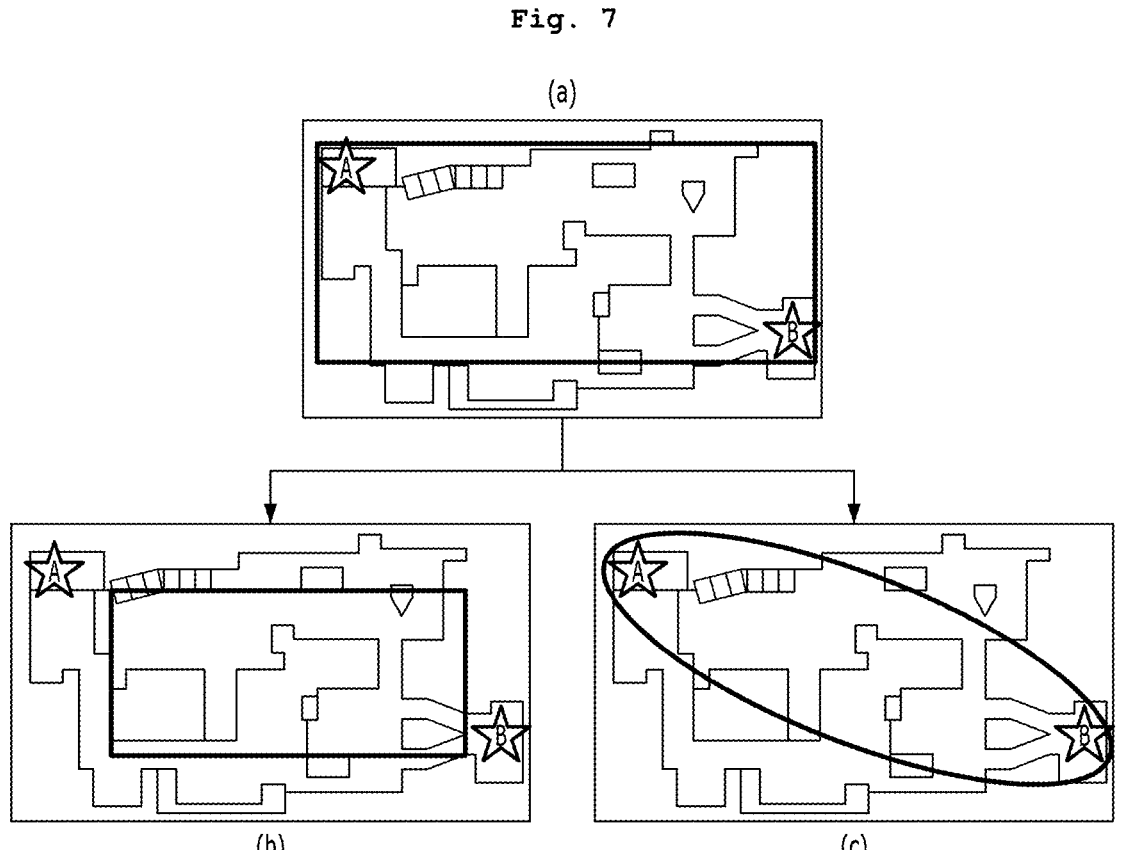

Meanwhile, the controller 140 may reduce the magnetic field area, and, more specifically, may reduce the magnetic field area based on the locations of the blast target objects. FIG. 7 is a diagram showing maps on which magnetic field areas are shown. More specifically, FIG. 7(*a*) shows an example of a map before the reduction of a magnetic field area, FIG. 7(*b*) shows an example in which the magnetic field area is reduced based on the locations at which a plurality of game users is present, and FIG. 7(*c*) shows an example in which the magnetic field area is reduced based on the locations of blast target objects. In this case, the magnetic field area may refer to the area bounded by the rectangle in FIGS. 7(a) and 7(b), and may refer to the area bounded by the oval in FIG. 7(c). For example, when the magnetic field area is reduced based on the locations at which a plurality of game users is present as shown in FIG. 7(b), a battle situation mainly occurs between game users when the game users cannot approach blast target objects and there are many cases in which a blast mission fails because game users cannot approach blast target objects, so that game users may lose interest in a game. However, when the magnetic field area is reduced based on the locations of the blast target objects as shown in FIG. 7(b), the magnetic field may serve as a type of passage that guides game users to the blast target objects.

As described above, according to the above-described embodiment, the controller 140 reduces the magnetic field area based on the locations of blast target objects, so that the magnetic field area can serve as a type of passage for guiding game users to the blast target objects. Accordingly, the probability that a game user will succeed in a blast mission increases, and thus there is an effect in that interest in the game can be improved.

Meanwhile, FIG. 8 is a flowchart illustrating a method of providing game maps according to an embodiment. The method of providing game maps shown in FIG. 8 includes steps that are processed in a time-series manner by the apparatus 100 for providing game maps shown in FIGS. 1 to 7. Accordingly, the descriptions that are omitted below but have been given above in conjunction with the apparatus 100 for providing game maps shown in FIGS. 1 to 7 may also be applied to the method of providing game maps shown in FIG. 8.

As shown in FIG. 8, the apparatus 100 for providing game maps according to the embodiment may store maps for the play of a blast mission game at step S810. In this case, the maps stored in the apparatus 100 for providing game maps may include different pieces of varied game play environment information. In this case, the game play environment information may include at least one of the location of at least one blast target object, one or more objects constituting the map, and a magnetic field area.

The apparatus 100 for providing game maps may provide a map including varied game play environment information for each round of a blast mission game at step S820. In this case, the game play environment may refer to a virtual space in the game that is provided to a game user in order to allow the game user to play the blast mission game therein. In this case, the game play environment information may include at least one of the location of at least one blast target object, one or more objects constituting the map, and a magnetic field area.

When the game user succeeds in a blast mission of the blast mission game, the apparatus 100 for providing game maps may provide a map in which game play environment information is varied by changing the location of the blast target object. Alternatively, when the game user succeeds in a blast mission of the blast mission game, the apparatus 100 for providing game maps may provide a map including varied game play environment information in which the location of the blast target object is changed and at least one change to at least one object destroyed by a battle having occurred during the performance of the blast mission is applied.

When the game user fails in a blast mission of the blast mission game, the apparatus 100 for providing game maps may provide a map including varied game play environment information in which the location of the blast target object is not changed but only at least one change to at least one object destroyed by a battle having occurred during the play of the blast mission game is applied. Alternatively, even when the game user fails in a blast mission of the blast mission game, the apparatus 100 for providing game maps may provide a map including varied game play environment information in which the location of the blast target object is changed and at least one change to at least one object destroyed during the play of the blast mission game is applied.

As each round of the blast mission game ends, the apparatus 100 for providing game maps may apply the game play environment information, varied in the previous round, to a map to be provided in a subsequent round and then provide the map. In other words, as each round of the blast mission game ends, the apparatus 100 for providing game maps may apply game play environment information, including at least one change to at least one object destroyed during the play of the blast mission game, to a map to be provided in a subsequent round and then provide the map, regardless of the success or failure of a blast mission.

The apparatus 100 for providing game maps may provide a map in which a magnetic field area is varied in game play environment information. In this case, the magnetic field area may refer to a battle area that is preset to limit the activity range within which the game user can move when playing the blast mission game. The apparatus 100 for providing game maps may vary the magnetic field area whenever the location of the blast target object is changed.

The apparatus 100 for providing game maps may reduce the size of the magnetic field area whenever each round ends. Furthermore, the apparatus 100 for providing game maps may reduce the magnetic field area, and, more specifically, may reduce the magnetic field area based on the location of the blast target object.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more central processing units (CPUs) in a device or secure multimedia card.

The method for providing game maps according to the embodiment descried through FIG. 8 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method for providing game maps according to the embodiment descried through FIG. 8 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method for providing game maps according to the embodiment descried through FIG. 8 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

According to any one of the above-described solutions, the apparatus and method for providing game maps are presented.

According to any one of the above-described solutions, a map including varied game play environment information is provided for each round of a blast mission game, so that a game user can perform various game strategies even when playing the game on the same map and the game user can feel changes in the game play style as the game strategies become diversified, with the result that the interest of the game user in the game can be further improved.

According to any one of the above-described solutions, a map including varied game play environment information is provided for each round of a blast mission game, so that a game user can be prevented from occupying an excellent spot in advance.

According to any one of the above-described solutions, the size of a magnetic field area is reduced whenever each round ends, so that the activity range of a game user who performs a blast mission is reduced, with the result that the execution time of a game can be shortened and also the immersion in the game can be improved.

The effects that can be obtained by the embodiments disclosed herein are not limited to the effects described above, and other effects not described above will be clearly understood by those having ordinary skill in the art, to which the present invention pertains, from the foregoing description.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. An apparatus for providing game maps, the apparatus comprising:

memory configured to store maps for a play of a blast mission game; and a controller configured to provide a map including varied game play environment information for each round of the blast mission game, wherein, based on at least one round of the blast mission game ending, the controller provides, in a round subsequent to the ending of the at least one round, a second map that is equivalent to a first map of the at least one round, and provides the second map in such a manner that at least part of game play environment information varied in the first map is applied to a second map to the second map.

2. The apparatus of claim 1, wherein the game play environment information includes at least one of a location of at least one blast target object, one or more objects constituting the map including the varied game play environment information, and a magnetic field area.

3. The apparatus of claim 2, wherein the controller provides the map including the varied game play environment information by changing the location of the at least one blast target object.

4. The apparatus of claim 2, wherein the controller provides the map including the varied game play environment information by reflecting at least one object constituting the map including the varied game play environment information and destroyed during the play of the blast mission game.

5. The apparatus of claim 4, wherein the controller provides the map including the varied game play environment information by reflecting the at least one object destroyed during performance of a blast mission of the blast mission game, when the blast mission succeeds.

6. The apparatus of claim 2, wherein the controller varies the magnetic field area whenever the location of the at least one blast target object is changed.

7. The apparatus of claim 2, wherein the controller reduces a size of the magnetic field area whenever the at least one round ends.

8. The apparatus of claim 7, wherein the controller reduces the magnetic field area based on the location of the at least one blast target object.

9. The apparatus of claim 1, wherein the blast mission game is provided in one mode of a shooting game.

10. A method of providing game maps, the method being performed by an apparatus for providing the game maps, the method comprising:

storing maps for a play of a blast mission game; and providing a map including varied game play environment information for each round of the blast mission game, wherein providing the map including the varied game play environment information comprises, based on at least one round of the blast mission game ending, providing, in a round subsequent to the ending of the at least one round, a second map that is equivalent to a first map of the at least one round, and providing the second map in such a manner that at least part of game play environment information varied in the first map is applied to the second map.

11. The method of claim 10, wherein the game play environment information includes at least one of a location of at least one blast target object, one or more objects constituting the map including the varied game play environment information, and a magnetic field area.

12. The method of claim 11, wherein providing the map comprises providing the map including the varied game play environment information by changing the location of the at least one blast target object.

13. The method of claim 11, wherein providing the map comprises providing the map including the varied game play environment information by reflecting at least one object constituting the map and destroyed during the play of the blast mission game.

14. The method of claim 13, wherein providing the map comprises providing the map including the varied game play environment information by reflecting the at least one object destroyed during performance of a blast mission of the blast mission game, when the blast mission succeeds.

15. The method of claim 11, wherein providing the map comprises varying the magnetic field area whenever the location of the at least one blast target object is changed.

16. The method of claim 11, wherein providing the map comprises reducing a size of the magnetic field area whenever the at least one round ends.

17. A non-transitory computer-readable storage medium having stored thereon a program that, when executed by a processor, causes the processor to execute the method of providing game maps set forth in claim 10.

18. A computer program that is executed by an apparatus for providing game maps and stored in a non-transitory computer-readable storage medium in order to perform the method of providing game maps set forth in claim 10.

* * * * *